Figure 7:
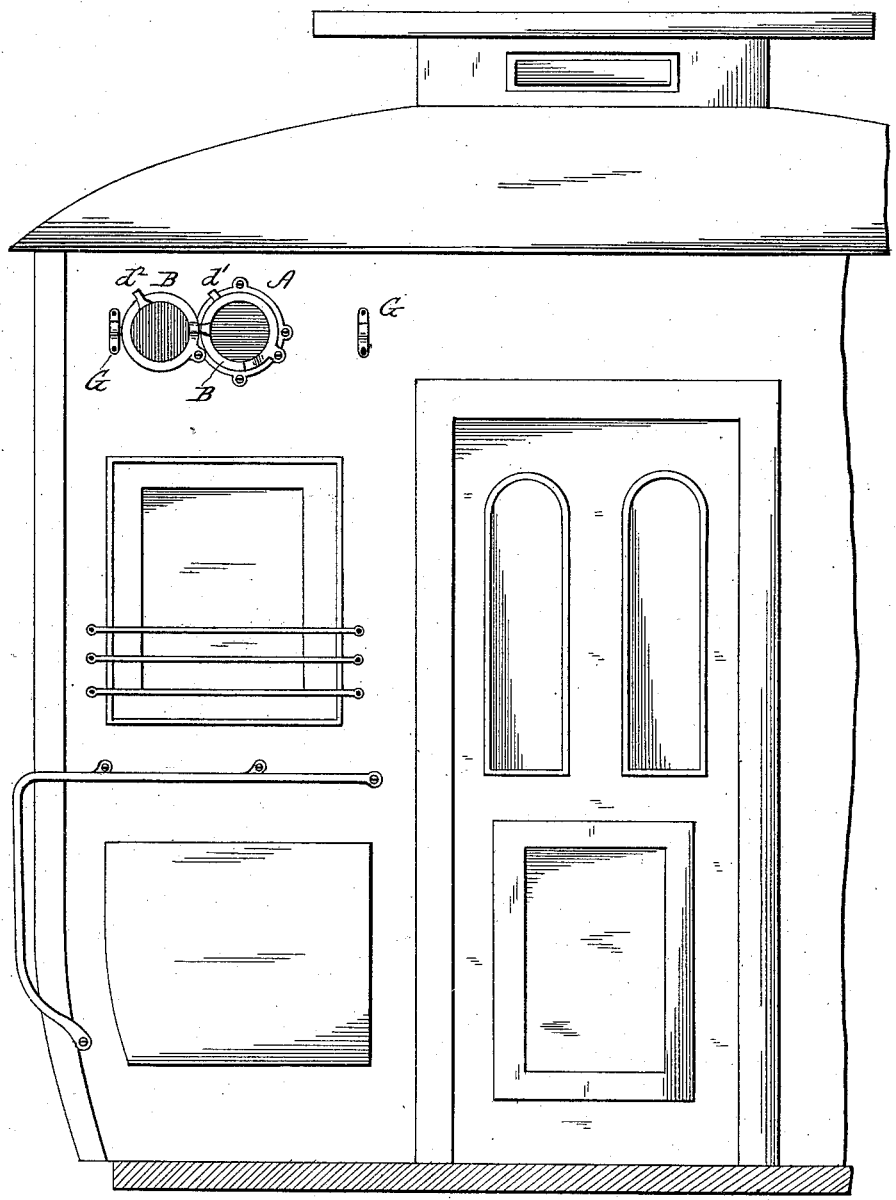

(No Model.) 2 Sheets—Sheet 1.
J. A. BRILL.
BULL'S EYE OR SIGNAL FOR STREET CARS.
No. 372,959. Patented Nov. 8, 1887.
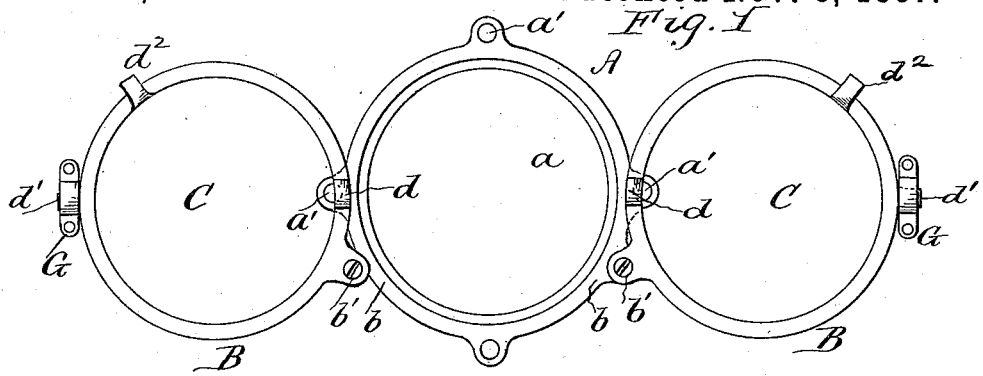
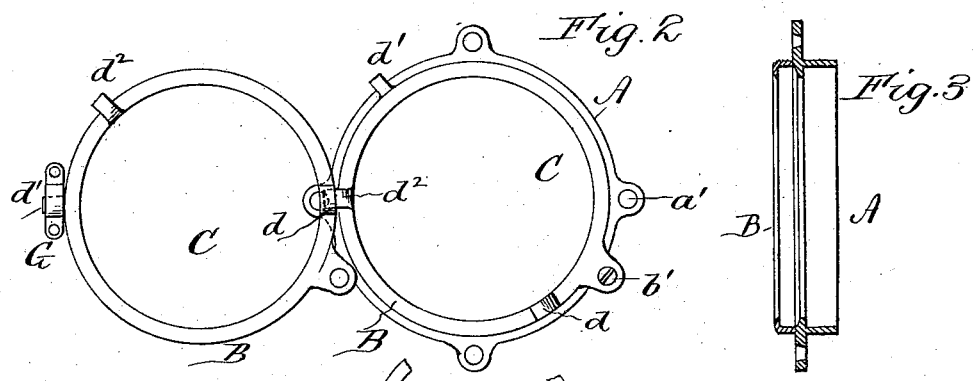
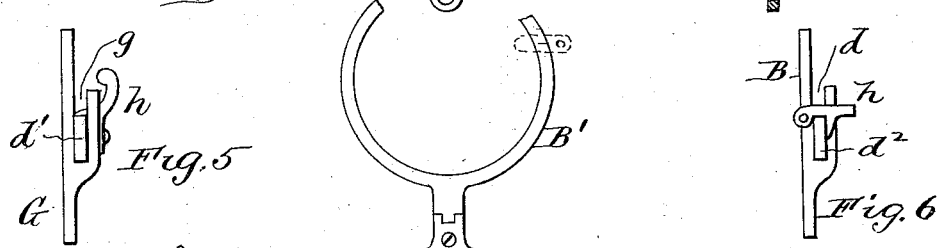
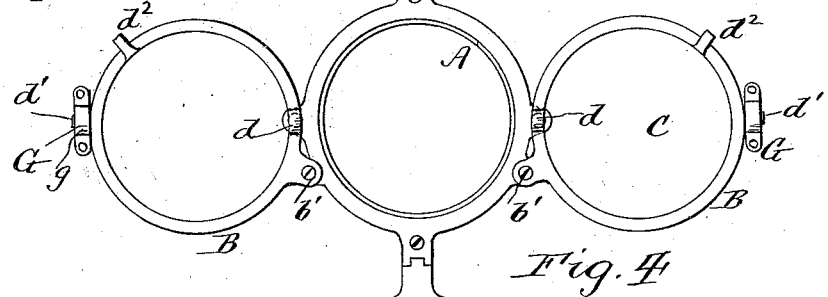
WITNESSES:
Wm H van Horn
Charles W. Rufe
INVENTOR
John A. Brill
By S. J. Van Stavoren
ATTORNEY (No Model.) 2 Sheets—Sheet 2.

J. A. BRILL.
BULL'S EYE OR SIGNAL FOR STREET CARS.

No. 372,959. Patented Nov. 8, 1887.

WITNESSES:

INVENTOR,
John A. Brill
By S. J. Van Stavoren
ATTORNEY

UNITED STATES PATENT OFFICE.

JOHN A. BRILL, OF PHILADELPHIA, PENNSYLVANIA.

BULL'S-EYE OR SIGNAL FOR STREET-CARS.

SPECIFICATION forming part of Letters Patent No. 372,959, dated November 8, 1887.

Application filed November 11, 1886. Serial No. 218,517. (No model.)

*To all whom it may concern:*

Be it known that I, JOHN A. BRILL, a citizen of the United States, residing at Philadelphia, in the county of Philadelphia and State of Pennsylvania, have invented certain new and useful Improvements in Bull's-Eyes or Signals for Street-Cars, of which the following is a specification.

My invention has relation to bull's eye or signal lights for street-railway cars.

It is well known in various systems or network of street-railways covering or operated in large cities, as well as in other places, that the cars of one line often travel over a portion of the tracks of another line, that cars of one company are often loaned to other companies, and that for other causes cars of different companies or lines are often run or travel upon one line of railway, but have different termini or destinations. As the cars for each line or those having different termini or destinations have different-colored bull's-eye or signal lights to make known at night to intended passengers the destination of the cars, it is desirable to provide the cars with a bull's-eye or signal the color of which can be maintained and changed or altered to suit the travel of the car, in order that passengers may ocularly determine which is the proper car to get into in order to reach their destination.

Heretofore to provide for changing the color of the bull's-eye or signal light to suit the requirements of the travel of the car, the bull's-eye was not usually colored, and a frame or guide was placed back of the eye or between it and the lamp, and a colored glass slide was inserted in the guide or frame to give the proper color to the bull's-eye or for the signal light. The objections to this described form are, that it necessitates carrying a number of glass slides of different colors upon the car, that the attendant or conductor is required to open the lamp-case and adjust the slides, which operation occupies time which in many cases cannot be spared, and to perform which in a crowded car is troublesome to the conductor and is a source of annoyance to the passengers sitting or standing in the immediate vicinity of the signal-light lamps, and that the slides through carelessness on part of the conductors are either often mislaid or broken, in which case the necessary signal-light is not exposed.

My invention has for its object to avoid these objections or to provide a bull's-eye or signal light the color of which can, without trouble to the conductors and annoyance to the passengers be instantly changed, as desired, and in which the different-colored glasses used for changing the color of the signal are permanent fixtures on the car, and cannot therefore be mislaid and are not readily broken or impaired by the usual service incident to their employment.

My invention therefore consists of a bull's-eye or signal frame, separate movable or adjustable frames on each side of the signal-frame, each provided with a different-colored glass or shade, and lugs and sockets on each of the movable or adjustable frames so arranged relatively to one another that when either of the movable frames is in position in front of the bull's-eye or signal frame one of the lugs on said movable frame engages with the socket on the other movable frame to lock itself in position in front of the bull's-eye, and when moved away from in front of the latter the other lug on the movable frame engages with a socket secured to the car to lock the frame in such position, and of the combination, construction, and arrangement of parts, as hereinafter described and claimed.

Referring to the accompanying drawings, Figure 1 is a plan of a bull's-eye or signal light and pivoted frames for the colored glasses, showing two such frames and the bull's-eye uncovered; Fig. 2, a like view showing the bull's-eye covered; Fig. 3, a vertical section through the center of the bull's-eye, and a movable frame, when in position, shown to the right in Fig. 2 through the bull's-eye; Fig. 4, a plan showing four frames, each having a colored glass for the bull's-eye, two of the frames being pivoted and two hinged to the frame of the bull's-eye. Figs. 5 and 6 are detail views showing different forms of locking mechanism for holding the colored-glass frames in a fixed position, either when they are covering or are away from the bull's-eye; and Fig. 7 is an elevation of part of one end of a car, showing the bull's-eye and colored frames in position on the same.

A represents the frame of the bull's-eye or signal $a$, of any suitable construction, having openings $a'$, through which pass screws or other suitable devices for fastening the frame to the car.

To one or each side of frame A are pivoted frames B B, in which are suitably fastened colored glasses C C, each glass being of a different color, and suitable lugs, b, are formed on frames A and B for the pivot screws or devices b', as desired. At proper points or places on each frame B are located a hook or socket, d, and lugs d' and d², one of these lugs, d', being, preferably, on the under side of the frame or that adjacent to the car. These sockets d and lugs d' and d² are so disposed upon frames B that when they are thrown off or rotated to one side of or away from the bull's-eye frame A the lugs d' engage with hooks g on brackets G, fastened to the car, and hold frames B in such described position, as shown in Fig. 1, and when one of the frames B is rotated over in front of or covers the bull's-eye the lug d² on said frame engages with the hook d of the other frame B, to maintain the position of the same in front of the bull's-eye, as indicated in Fig. 2.

By moving one or the other of frames B over the bull's-eye different-colored lights for different signals will show, and as the frames B are always in position or affixed to frame A or to the car, said frames can be instantly adjusted in position over the bull's-eye to give the required signal-light without trouble to the passengers or to the conductor.

If desired, spring or other catches h may be provided on hooks d and g for engagement with lugs d' d², to more firmly lock the frames B in their adjusted positions and prevent any possible jolting of the lugs d' d² from the hooks d and g by the vibrations of the car as it is propelled. (See Figs. 5 and 6.)

When more than two frames B are used, one or more of the frames may be hinged to frame A or to the car, in which case they fold down upon and are raised from the bull's-eye. Two of these folding frames, B' B', are illustrated in Fig. 4, which also shows turn-buckles or other suitable devices for retaining the folding frames B in their adjusted positions. I prefer to secure the frames B B' to frame A; but it is obvious that the above-described advantages are obtainable when the frames B B' are secured to the car, instead of the frame A, directly, and hence I do not limit myself to any particular manner of securing the frames B B' in position upon a car.

What I claim is—

1. The combination, with a bull's-eye or signal frame, A, of separate movable or adjustable frames B B on each side of frame A, and each provided with a different-colored glass or shade and adapted to be thrown into position in front of frame, and lugs d' d² and sockets d on each of the frames B B, substantially as and for the purpose set forth.

2. The combination of frame A, separate frames B B, pivoted or hinged to frame A, and lugs d' and d² and sockets d on each of said frames B B, so arranged relatively to one another that when either of the frames B B is thrown in front of frame A the lug on the frame B so moved engages with the socket on the other frame B, substantially as set forth.

3. The combination of frame A, side frames, B B, pivoted or hinged to frame A, and each having lugs d' d² and a socket, d, and separate sockets G, all arranged for operation substantially as shown and described.

4. The combination of frame A, separate pivoted side frames, B B, each having integral lugs d' d² and socket d, and hinged frames B' B', at right angles to frames B B, substantially as set forth.

5. The combination of frame A, separate side frames, B B, pivoted or hinged to frame A, and each having lugs d' d² and a socket, d, and separate sockets G, having catches h, substantially as set forth.

6. In combination with a car, a fixed bull's-eye or signal frame, A, separate pivoted frames B B on each side of frame A, and each having lugs d' and d² and a socket, d, and sockets G, secured to said car, and all arranged for operation substantially as set forth.

In testimony whereof I affix my signature in presence of two witnesses.

JNO. A. BRILL.

Witnesses:
 THS. RANDALL,
 S. J. VAN STAVOREN.